(12) United States Patent
Suzuki et al.

(10) Patent No.: US 9,815,465 B2
(45) Date of Patent: Nov. 14, 2017

(54) CONTROL DEVICE FOR AN INTERNAL COMBUSTION ENGINE

(71) Applicant: TOYOTA JIDOSHA KABUSHIKI KAISHA, Toyota-shi, Aichi-ken (JP)

(72) Inventors: Yusuke Suzuki, Hadano (JP); Susumu Kojima, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/149,593

(22) Filed: May 9, 2016

(65) Prior Publication Data
US 2016/0332628 A1 Nov. 17, 2016

(30) Foreign Application Priority Data
May 11, 2015 (JP) .................................. 2015-096224

(51) Int. Cl.
*B60W 30/18* (2012.01)
*B60W 10/06* (2006.01)
(Continued)

(52) U.S. Cl.
CPC ...... *B60W 30/18018* (2013.01); *B60W 10/06* (2013.01); *F02D 17/04* (2013.01);
(Continued)

(58) Field of Classification Search
CPC ............. F02N 11/0814; F02N 11/0825; F02N 11/0829; F02N 11/0844; F02N 99/00;
(Continued)

(56) References Cited

U.S. PATENT DOCUMENTS 7,562,650 B2 * 7/2009 Tabata ................ F02D 13/0234
123/179.4
8,036,817 B2 * 10/2011 Ota ....................... F02B 23/104
123/179.16
(Continued)

FOREIGN PATENT DOCUMENTS

JP 2005-163612 A 6/2005
JP 2006-283671 A 10/2006
(Continued)

*Primary Examiner* — Erick Solis
(74) *Attorney, Agent, or Firm* — Andrews Kurth Kenyon LLP

(57) ABSTRACT

A control device according to the present invention performs an automatic stop control in which an injection of fuel from a fuel injection valve is stopped and a rotation of an engine is stopped when an automatic stop condition is satisfied. Furthermore, the control device controls an injection operation of fuel and an ignition operation to the fuel in consideration of compression when the fuel is actually ignited in an expansion stroke cylinder, when a re-start demand occurs after an initiation of the automatic stop control and the engine is to be re-started by an ignition start-up. Specifically, the control device predicts a crank angle at an actual ignition time point in a case where processing for performing the ignition start-up at the present time whenever a predetermined time period has passed. Then, the control device initiates the ignition start-up when the crank angle falls within a predetermined range in which a sufficient compression can be attained. Thereby, the engine is more certainly re-started by the ignition start-up.

7 Claims, 13 Drawing Sheets

(51) Int. Cl.
  *F02D 17/04* (2006.01)
  *F02N 11/08* (2006.01)
  *F02N 99/00* (2010.01)
  *F02N 19/00* (2010.01)
(52) U.S. Cl.
  CPC ...... *F02N 11/0825* (2013.01); *F02N 11/0844* (2013.01); *F02N 99/004* (2013.01); *F02N 99/006* (2013.01); *B60W 2510/0685* (2013.01); *B60W 2520/04* (2013.01); *F02N 2019/007* (2013.01); *F02N 2019/008* (2013.01); *F02N 2200/021* (2013.01); *F02N 2200/022* (2013.01); *F02N 2250/04* (2013.01); *F02N 2300/2002* (2013.01)
(58) Field of Classification Search
  CPC .... F02N 99/002; F02N 99/004; F02N 99/006; F02N 2019/007; F02N 2019/008; F02N 2200/021
  USPC .............................................. 123/179.4, 491
  See application file for complete search history.

(56) References Cited

U.S. PATENT DOCUMENTS

| 9,683,496 B2* | 6/2017 | Kojima | F02D 37/02 |
| 2005/0109302 A1* | 5/2005 | Tetsuno | F02D 41/042 |
| | | | 123/179.5 |
| 2007/0062476 A1* | 3/2007 | Ota | F02B 23/104 |
| | | | 123/179.4 |
| 2016/0003207 A1* | 1/2016 | Kojima | B60K 6/48 |
| | | | 477/5 |

FOREIGN PATENT DOCUMENTS

| JP | 2010-133367 A | 6/2010 |
| JP | 2013-096232 A | 5/2013 |

* cited by examiner

CONTROL DEVICE FOR AN INTERNAL COMBUSTION ENGINE

CROSS-REFERENCE TO RELATED APPLICATION

The present application claims priority to Japanese Patent Application No. 2015-096224 filed on May 11, 2015, which is incorporated herein by reference in its entirety.

TECHNICAL FIELD

The present invention relates to a control device which has a function to automatically stop and re-start an internal combustion engine (hereafter may be referred to as an "engine").

BACKGROUND ART

Conventionally, a control device that performs an automatic stop control in which operation (rotation) of an engine is automatically stopped when a predetermined automatic stop condition is satisfied for the purpose of improvement of fuel consumption of a vehicle carrying an engine and reduction of a quantity of exhaust gas discharged from the vehicle has been known.

Such a control device will re-start an engine automatically, when a demand for re-start of an engine occurs in a case where an accelerator pedal operation is made or in a case where a brakes operation is released. In this case, the control device re-starts an engine, for instance, by performing any of (1) a normal control, (2) an ignition start-up control, and (3) a starter start-up control, depending on an engine rotational speed at the time of occurrence of a re-start demand.

The ignition start-up control is performed when the engine rotational speed has been decreased to a level at which it is difficult to re-start the engine by the normal control (a fuel injection and an ignition during a normal operation) although the engine rotational speed has not reached "0 (zero)" completely. In accordance with the ignition start-up control, a fuel injection and an ignition are performed in a cylinder in an expansion stroke (hereafter, may be referred to as an "expansion stroke cylinder") so that a cylinder in a compression stroke (hereafter, may be referred to as a "compression stroke cylinder") can get over a top dead center of the cylinder.

By the way, in the ignition start-up, compression in the cylinder may become insufficient and inertia sufficient to re-start an engine may not be obtained after ignition even though a fuel injection and an ignition are performed at that time, when a piston of the expansion stroke cylinder is away from the top dead center. Therefore, a technology for certainly re-starting an engine by standing by until a rotational direction of the engine is inverted to a reversed rotational direction and performing a fuel injection and an ignition in an expansion stroke cylinder after the inversion (for instance, refer to Japanese Patent Application Laid-Open "kokai" No. 2005-163612 (JP2005-163612)).

SUMMARY OF INVENTION

However, the compression in the expansion stroke cylinder is not necessarily increased sufficiently just because the rotational direction of the engine is inverted to the reversed rotational direction. Even though a fuel injection and an ignition are performed when the compression in the expansion stroke cylinder is not sufficiently high, sufficient inertia may not be obtained after ignition and an engine may not be re-started. Therefore, in order to more certainly re-start an engine by the ignition start-up, it is necessary to perform a fuel injection and an ignition when the compression in the expansion stroke cylinder is sufficiently high.

In addition, a predetermined time period is required from when initiating a processing for performing the ignition start-up (for instance, a fuel injection and an ignition) in the expansion stroke cylinder till when fuel is actually ignited. For instance, even though a fuel injection and an ignition are performed immediately when a re-start condition is satisfied, fuel is actually ignited after a predetermined time period has passes, a crankshaft continues a rotation and a position of the piston changes in this time period. Therefore, even though the compression of the expansion stroke cylinder is sufficiently high at the time when the re-start condition is satisfied, compression may be decreased when fuel is actually ignited, and inertia sufficient to re-start the engine may not be obtained after ignition. In such a case, an engine cannot be certainly re-started by the ignition start-up.

The present invention has been conceived in order to cope with the above-mentioned issue. Namely, the objective of the present invention is to provide a control device which can more certainly re-start an engine by the ignition start-up, in consideration of compression when fuel is actually ignited in the expansion stroke cylinder.

A control device for an internal combustion engine according to the present invention (hereafter, may be referred to as the "present invention device") is applied to an internal combustion engine comprising a fuel injection part which supplies fuel to an combustion chamber, an ignition part which ignites the fuel supplied to said combustion chamber, a crankshaft, and a rotational speed detector which detects a crank angle that is a rotational position of said crankshaft and detects an engine rotational speed that is a rotational speed of said crankshaft.

Furthermore, the present invention device comprises a control part that can perform an automatic stop control in which a fuel supply by said fuel injection part is stopped and a rotation of said crankshaft is stopped when a predetermined automatic stop condition is satisfied, and can re-start said internal combustion engine when a predetermined re-start condition is satisfied.

In addition, said control part comprises a predicted crank angle calculation part and an ignition start-up part.

The predicted crank angle calculation part calculates a predicted crank angle, whenever a predetermined time period has passed, when said predetermined re-start condition is satisfied at or after a first time inversion time point that is a time point when a rotational direction of said crankshaft is inverted for the first time during execution of said automatic stop control. The predicted crank angle is a crank angle on the basis of a top dead center of a cylinder in an expansion stroke at a predicted ignition time. The predicted ignition time is a time point at which an ignition of fuel is predicted to take place if processing for performing an ignition start-up was initiated at the present time. The ignition start-up is a method in which fuel is supplied to a combustion chamber of a cylinder in an expansion stroke by said fuel injection part and said fuel supplied to said combustion chamber of said cylinder is ignited by said ignition part, and thereby said engine is started up.

The ignition start-up part re-starts said internal combustion engine by said ignition start-up when said predicted crank angle is not larger than a predetermined upper limit angle, and does not initiate said ignition start-up when said predicted crank angle is larger than said upper limit angle.

As mentioned above, in accordance with the present invention device, the ignition start-up is performed in a case where a crank angle at a time point when an ignition of fuel is predicted to takes place after supplying fuel to a combustion chamber of a cylinder in an expansion stroke and igniting the fuel becomes not larger than an upper limit angle, and the ignition start-up is not performed in a case where the crank angle exceeds the upper limit angle. As a result, since an ignition of fuel takes place when the compression in an expansion stroke cylinder is sufficiently high, sufficient inertia is obtained after ignition. Therefore, in accordance with the present invention device, an engine can be certainly re-started by the ignition start-up.

In the above, said predicted crank angle calculation part may be configured to calculate said predicted crank angle by using, as said predicted ignition time, a time point when a predetermined ignition-required time period has passed since the present time.

It can be considered that a major portion of the ignition-required time period is occupied by a time period required from a time point when fuel is subjected to an ignition to a time point when the fuel is actually ignited (henceforth, may be referred to as an "ignition time period").

Therefore, said predicted crank angle calculation part may be configured to calculate said predicted crank angle by using, as said predicted ignition time, a time point when said predetermined ignition-required time period containing an ignition time period, which is a time period required from a time point when fuel was subjected to an ignition to a time point when the fuel was actually ignited if said processing for performing said ignition start-up was initiated at the present time.

In this case, the predicted crank angle calculation part identifies the predicted ignition time based on the ignition-required time period containing the ignition time period, and calculates the predicted crank angle at the identified predicted ignition time. Therefore, since the predicted crank angle calculation part can calculates more accurate predicted crank angle, an engine can be more certainly re-started by the ignition start-up.

By the way, in order to ignite fuel supplied to a combustion chamber, it is necessary for the fuel and air to be mixed with each other and to form a burnable fuel-air mixture. Therefore, it is desirable to take into consideration, not only a time point when the fuel is ignited by the ignition part, but also a time point when the fuel is supplied by the fuel injection part, in the calculation of the predicted ignition time.

Then, said predicted crank angle calculation part may be configured to calculate said predicted crank angle at said predicted ignition time identified based on a time point when fuel is supplied by said fuel injection part if said ignition start-up was initiated at the present time.

More specifically, said predicted crank angle calculation part may be configured to calculate said predicted crank angle by using, as said predicted ignition time, a time point when said predetermined ignition-required time period containing a fuel-air mixture formation time period which is a time period required from a time point when fuel was supplied by said fuel injection part to a time point when a fuel-air mixture was formed if said processing for performing said ignition start-up was initiated at the present time.

In the above, the predicted crank angle calculation part identifies the predicted ignition time based on a time point when fuel is supplied by the fuel injection part. Namely, the predicted ignition time is identified in consideration of the fuel-air mixture formation time period which is a time period required for fuel and air supplied to the combustion chamber to be mixed with each other and to form a burnable fuel-air mixture which. Thereby, an engine can be more certainly re-started by the ignition start-up.

In addition, in the above, the predicted crank angle calculation part can identify the predicted ignition time based on not only the time point when fuel is ignited by the ignition part, but also the time point when fuel is supplied by the fuel injection part. Namely, the predicted crank angle calculation part can identify the predicted ignition time, not only in consideration of the ignition time period which is a time period required from a time point when fuel was subjected to an ignition to a time point when the fuel was actually ignited, but also in consideration of the fuel-air mixture formation time period which is a time period required from a time point when fuel was supplied by the fuel injection part to a time point when a fuel-air mixture was formed, if the processing for performing the ignition start-up was initiated at the present time.

Specifically, said predicted crank angle calculation part may be configured to calculate said predicted crank angle by using, as said predicted ignition time, a time point when said predetermined ignition-required time period containing not only said ignition time period, but also a fuel-air mixture formation time period. Thereby, an engine can be re-started further more certainly by the ignition start-up.

By the way, the above-mentioned ignition-required time period may be a constant fixed value. However, behaviors, such as a formation and in ignition of a fuel-air mixture in an expansion stroke cylinder, change depending on a situation of an engine, such as an engine rotational-speed and a crank angle, for example. For instance, the compression in an expansion stroke cylinder has a great influence on an ignition behavior of fuel. It is desirable that the ignition-required time period has a value which changes according to a crank angle at a time point of an ignition, since the compression changes according to the crank angle.

Therefore, said predicted crank angle calculation part may be configured to memorize a correspondence relation between a crank angle on the basis of an top dead center of a cylinder in an expansion stroke and said ignition-required time period in a case where said processing for performing said ignition start-up was initiated at said crank angle in said cylinder, and may be configured to identify said ignition-required time period by applying, to said correspondence relation, a crank angle on the basis of the top dead center of said cylinder in an expansion stroke at the present time.

In this case, the predicted crank angle calculation part identifies the ignition-required time period corresponding to the crank angle of the expansion stroke cylinder at the present time based on the above-mentioned correspondence relation, identifies the predicted ignition time based on this identified ignition-required time period, and calculates the predicted crank angle at the identified predicted ignition time. Therefore, since the predicted crank angle calculation part can more accurately calculate the predicted crank angle, an engine can be re-started further more certainly by the ignition start-up.

By the way, the predicted crank angle is the crank angle (on the basis of the top dead center) at the predicted ignition time in the cylinder in the expansion stroke, as mentioned above. Therefore, the difference of the crank angle of the expansion stroke cylinder at the present time and the predicted crank angle changes depending on a time length of a time period from the present time to the predicted ignition (namely, the ignition-required time period as a time length) and the rotational speed (angular velocity) of the crank in the time period.

Then, in an aspect of the present invention device, said predicted crank angle calculation part is configured to calculate said predicted crank angle based on a crank angle on the basis of the top dead center of said cylinder in an expansion stroke at the present time, said ignition-required time period as a time length, and a predetermined angular velocity.

The above-mentioned angular velocity may be a pair of fixed values which have different signs (a positive sign and a negative sign) according to whether the crankshaft of the engine is in a normal rotational state or in a reversed rotational state, for example. More preferably, it is desirable that the above-mentioned angular velocity is a value which changes according to the engine rotational speed. Typically, as the above-mentioned angular velocity, a value which is determined based on an engine rotational speed at the present time is adopted.

Accordingly, said predicted crank angle calculation part may be configured to calculate said predicted crank angle using said angular velocity which is determined based on an engine rotational speed at the present time.

In accordance with the above, since the predicted crank angle calculation part can more accurately calculate the predicted crank angle based on the more accurate angular velocity, an engine can be re-started still further more certainly by the ignition start-up.

Other objective, other features, and accompanying merits of the present invention will be easily understood from the following explanation about respective embodiments of the present invention described referring to drawings.

DESCRIPTION OF EMBODIMENTS

Hereafter, a "control device for an internal combustion engine" according to an embodiment of the present invention (hereafter, may be referred to as the "present device") will be explained.

(Configuration)

Figure 1:
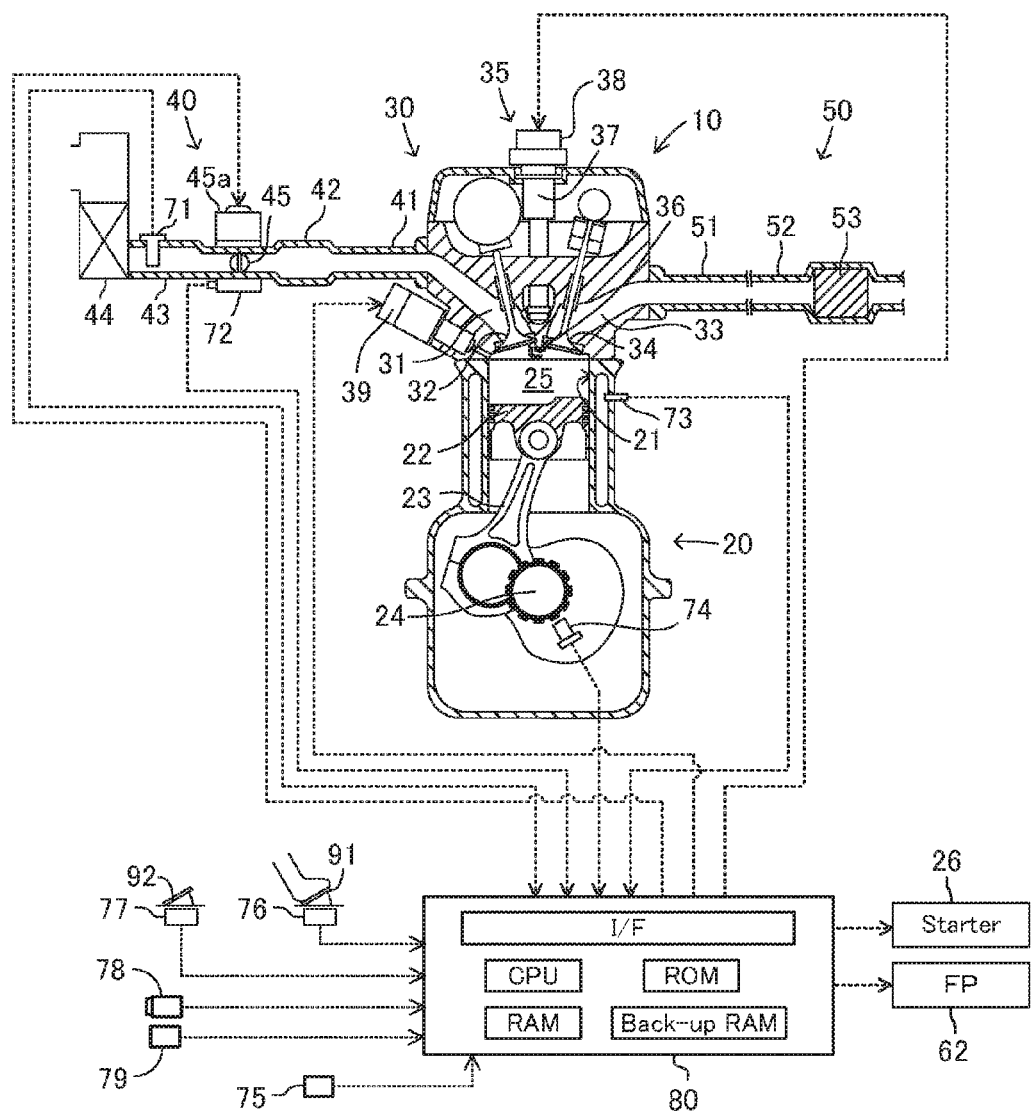
FIG. 1 is a schematic diagram of a "control device for a multi-cylinder internal combustion engine" according to an embodiment of the present invention and a multi-cylinder internal combustion engine to which the control device is applied.

The present device is applied to an internal combustion engine (engine) 10 showed in FIG. 1. The engine 10 is a multi-cylinder (in this example, in-line four-cylinder) four-stroke piston-reciprocating cylinder-injection (direct injection), a spark-ignition gasoline-fuel engine.

The engine 10 comprises a cylinder block part 20 including a cylinder block, a cylinder block lower case, oil pan, etc., a cylinder head part 30 fixed on the cylinder block part 20, an intake system 40 for supplying air to the cylinder block part 20, and an exhaust system 50 for emitting exhaust gas from the cylinder block part 20 to the outside.

The cylinder block part 20 comprises a cylinder 21, a piston 22, a connecting rod 23, and a crankshaft 24. The piston 22 reciprocates inside the cylinder 21. Reciprocating movement of the piston 22 is transmitted to the crankshaft 24 through the connecting rod 23 and, thereby, the crankshaft 24 rotates. The cylinder 21, the piston 22, and the cylinder head part 30 form a combustion chamber (cylinder) 25.

The cylinder block part 20 comprises a starter motor (may be referred to as only a "starter") 26. The starter 26 operates in response to an instruction of an engine ECU (Electronic Control Unit) 80, which will be mentioned later, and rotates a ring gear (not shown) attached to the crankshaft 24. Namely, the starter 26 performs cranking.

The cylinder head part 30 comprises an intake port 31 which is communicated to the combustion chamber 25, an intake valve 32 which opens and closes the intake port 31, an exhaust port 33 communicated to the combustion chamber 25, an exhaust valve 34 which opens and closes the exhaust port 33, an ignition apparatus 35 which ignites fuel in the combustion chamber 25, and a fuel injection valve 39 which injects fuel directly to the combustion chamber 25.

The ignition apparatus 35 comprises a spark plug 36 and an ignition coil 37 and an igniter 38 which generate high voltage given to the spark plug 36. An electrode part (sparking part for an ignition) of the spark plug 36 is exposed to the combustion chamber 25 in a central part of an upper part of the combustion chamber 25.

The fuel injection valve 39 is disposed in the cylinder head part 30 so that the fuel injection hole is exposed in the combustion chamber 25. The fuel injection valve 39 opens in response to an instruction of the ECU 80, and injects fuel directly to the combustion chamber 25.

The intake system 40 comprises an intake manifold 41 which is communicated to the intake port 31, a surge tank 42 which is communicated to the intake manifold 41, and an intake pipe 43, one of whose ends is connected to the surge tank 42. The intake port 31, the intake manifold 41, the surge tank 42, and the intake pipe 43 constitute an intake passage.

Furthermore, the intake system 40 comprises an air filter 44 and a throttle valve 45. The throttle valve 45 is supported in the intake pipe 43 in a rotatable manner. A throttle valve actuator 45a consists of a DC motor, and changes an opening of the throttle valve 45 by driving the throttle valve 45 in response to an instruction of the ECU 80.

The exhaust system 50 comprises an exhaust manifold 51 which is communicated to the exhaust port 33 and an exhaust pipe 52 which is connected to the exhaust manifold 51. The exhaust port 33, the exhaust manifold 51, and the exhaust pipe 52 constitute an exhaust passage.

Furthermore, the exhaust system 50 comprises a ternary catalyst (a three-way catalytic converter, an exhaust-gas-purification catalyst) 53. The ternary catalyst 53 is disposed in the exhaust pipe 52, and has a function to oxidizes unburned components such as HC, CO, and $H_2$, and to reduce NOx (nitrogen oxide) when an air-fuel ratio of gas flowing into the combustion chamber 25 is a theoretical air-fuel ratio. The ternary catalyst 53 has an oxygen occlusion function to occlude (store) oxygen, and can purify the unburned components and NOx by this oxygen occlusion function even when the air-fuel ratio deviates from the theoretical air-fuel ratio.

The engine 10 comprises a fuel pump system 62. The fuel pump system 62 comprises "a low-pressure pump, a high-pressure pump, and an electromagnetic valve for a fuel-pressure adjustment" which are not shown. The fuel pump system 62 pumps up fuel from a fuel tank which is not shown with a fuel pump, and supplies the fuel to the fuel injection valve 39 after adjusting the pressure of the fuel to a target fuel pressure in response to an instruction of the ECU 80.

The ECU 80 is an electronic circuit including a well-known microcomputer, and comprises a CPU, a ROM, a RAM, a backup RAM, an interface, etc. The ECU 80 is connected with the sensors described below and receives (is inputted) signals from these sensors.

An air flow meter 71: This measures a mass flow rate of air which passes through the intake pipe 43 and is inhaled into the engine 10 (intake air mass Ga), and outputs a signal representing this intake air mass Ga.

A throttle position sensor 72: This detects the opening of the throttle valve 45 (throttle valve opening TA), and outputs a signal representing this throttle valve opening TA.

A water temperature sensor 73: This measures the temperature of cooling water which cools the engine 10 (cooling water temperature THW), and outputs a signal representing this cooling water temperature THW.

A crank angles sensor 74: This generates one pulse signal whenever the crankshaft 24 rotates a fixed angles (for instance, 10 [deg.]). The ECU 80 acquires a crank angle of the engine 10 on the basis of a compression top dead center of a predetermined cylinder (absolute crank angle) based on signals from this sensor 74 and a cam position sensor which is not shown. Furthermore, the ECU 80 acquires an engine rotational speed NE based on a signal from the crank angle sensor 74.

A fuel pressure sensor 75: This measures pressure of fuel supplied to the fuel injection valve 39 (fuel pressure PF), and outputs a signal representing this fuel pressure PF.

An accelerator pedal operation amount sensor 76: This detects an operation amount Accp of an accelerator pedal 91, and outputs a signal representing this operation amount Accp.

A brake switch 77: This detects an operation of the brake pedal 92 and outputs a signal representing that the brake pedal 92 is operated.

A vehicle speed sensor 78: This measures speed of a vehicle (vehicle speed SPD) on which the engine 10 is mounted, and outputs a signal representing this vehicle speed SPD.

An ignition switch 79: This is a switch which is a switch operated by a driver in order to operate the engine 10 or to stop the operation of the engine 10, and it sends out a signal representing its ON-OFF state to the ECU 80.

Furthermore, the ECU 80 sends out an instruction (drive) signal to various actuators (a throttle valve actuator 45a, an ignition apparatus 35, and a fuel injection valve 39, etc.).

(Outline of an Operation of the Present Device)
<Automatic Stop and Automatic Re-Start Control>

The present device performs an automatic stop control in which a fuel supply by the fuel injection valve 39 is stopped and a rotation of the engine 10 is stopped when a predetermined automatic stop condition is satisfied. The automatic stop condition in this example is satisfied when all the following conditions are satisfied.

(A1) The brake pedal 92 is depressed (operated).

(A2) The accelerator pedal 91 is not depressed (not operated).

(A3) The vehicle speed SPD is not higher than a predetermined speed SPDth.

When a re-start demand occurs after the automatic stop control was initiated, the present device starts up (re-starts) the engine 10 by performing any of the following controls according to the engine rotational speed NE at that time. In addition, in this example, a re-start demand is generated when the accelerator 91 begins to be depressed after an initiation of the automatic stop control.

(B1) In a case where the engine rotational speed NE at a time point when the re-start demand occurs is higher than first threshold value speed NE1 (NE>NE1), the present device performs the normal control (normal operation start-up control) to re-start the engine 10. The normal control is a "control during normal operation" in which a fuel injection is performed in the second half of a compression stroke and an ignition is performed near a compression top dead center. Therefore, the starter motor 26 is not driven by the normal control.

(B2) In a case where the engine rotational speed NE at a time point when the re-start demand occurs is not higher than the first threshold value speed NE1 and is higher than second threshold value speed NE2 (NE2<NE≤NE1), the present device performs the ignition start-up control to re-start the engine 10. The ignition start-up control is a control in which a fuel injection is performed in the first half of an expansion stroke and an ignition is performed immediately thereafter in a "cylinder in the first half of the expansion stroke (for instance, whose crank angle is between 10 [deg.] and 30 [deg.] after a compression top dead center)" or a "cylinder which reaches the first half of the expansion stroke for the first time after an occurrence of the re-start demand" at a time point when the re-start demand occurs. Hereafter, the "cylinder in the first half of the expansion stroke" and the "cylinder which reaches the first half of the expansion stroke for the first time after an occurrence of the re-start demand" may be referred to as an "expansion stroke cylinder." Furthermore, a cylinder which is in a compression stroke in a time period during which the expansion stroke cylinder is in the expansion stroke may be referred to as a "compression stroke cylinder." In addition, the starter motor 26 is not driven by the ignition start-up control.

(B3) In a case where the engine rotational speed NE at a time point when the re-start demand occurs is not higher than the second threshold value speed NE2 (NE≤NE2), the present device waits for the engine rotational speed NE to fall to third threshold value speed NE3 (NE<NE3<NE2) and performs the starter start-up control to re-start the engine 10. The starter start-up control is a control in which a fuel injection is performed in the second half of a compression stroke and an ignition is performed near a compression top dead center, while cranking the engine 10 by operating the starter 26.

<Fuel Being Subjected to an Ignition and Being Ignited in the Ignition Start-Up Control>

One of features of the present device is in that, in the above-mentioned ignition start-up control, an injection operation and an ignition operation of fuel are controlled in consideration of the compression when fuel in an expansion stroke cylinder is actually ignited. Specifically, an actual ignition time point and a crank angle at the ignition time point in a case where an injection and an ignition of fuel is performed at the present time are predicted whenever a predetermined time period has passed. Then, when the crank angle falls within a predetermined range in which a sufficient compression can be attained, a re-start of the engine by the ignition start-up is performed.

Then, timings and crank angles when fuel is subjected to an ignition and when the fuel is actually ignited in an expansion stroke cylinder in the ignition start-up control will be explained below in detail, referring to FIG. 2(*a*) and FIG. 2(*b*). In both FIG. 2(*a*) and FIG. 2(*b*), in order to facilitate the explanation, temporal alteration of crank angle of an expansion stroke cylinder until the engine 10 stops by execution of the automatic stop control is indicated with a solid curve line.

Figure 2A:
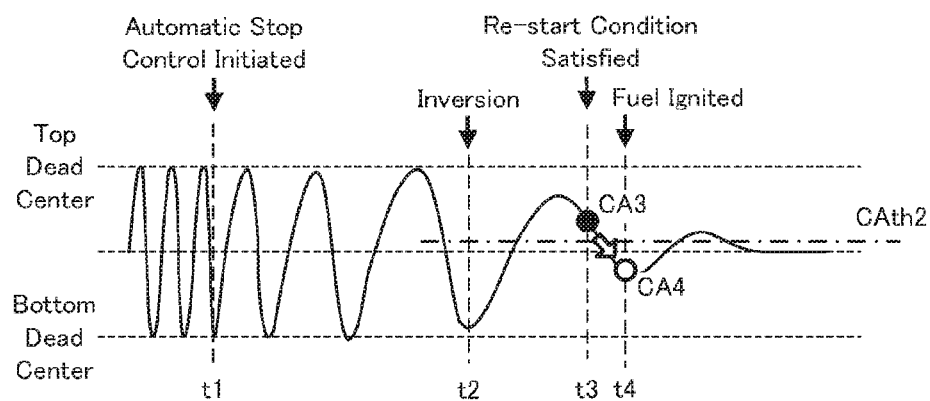
FIG. 2(a) and FIG. 2(b) are schematic time charts for showing a timing when fuel is subjected to an ignition, a timing when the fuel is actually ignited, and crank angles at the respective timings in an expansion stroke cylinder in the ignition start-up control.
Figure 2B:
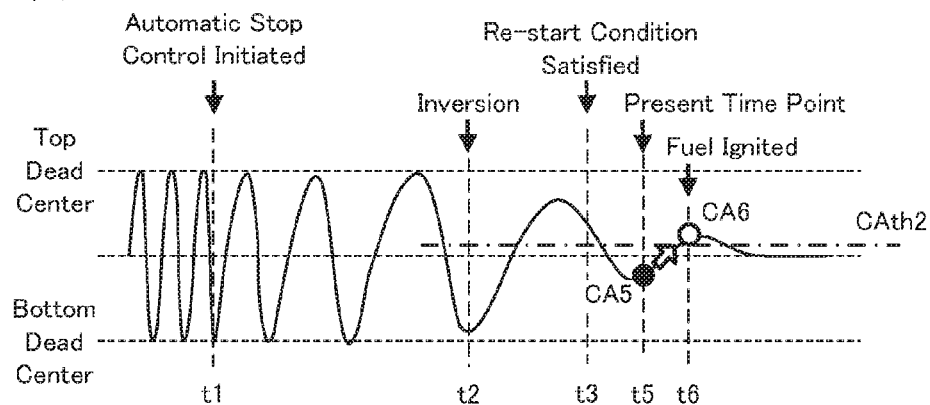

First, FIG. 2(*a*) shows an example in which a crank angle at a time point when fuel is actually ignited cannot attain inertia sufficient to re-start the engine 10, even though the fuel is subjected to an ignition at a time point when the re-start demand occurs in a time period during which the automatic stop control is being performed.

In this example, the automatic stop control in which an injection of fuel from the fuel injection valve 39 is stopped to stop a rotation of the engine 10 is initiated at the time t1. Thereafter, the engine rotational speed NE falls gradually, the inversion from a normal rotation to a reversed rotation of the rotational direction of the crankshaft 24 takes place for the first time at the time t2, and a re-start condition is satisfied at the time t3. The crank angle CA3 at this time T3 is not larger than the upper limit of a crank angle which can attain inertia sufficient to re-start the engine 10 after ignition (upper limit angle CAth2). In other words, the crank angle CA3 is sufficiently close to the top dead center. Therefore, if fuel can be ignited at this time point, inertia sufficient to re-start the engine 10 can be obtained. Namely, the engine 10 can be re-started by the ignition start-up.

However, as mentioned above, from when initiating processing for performing the ignition start-up (for instance, an injection and an ignition of fuel) till when the fuel is actually ignited, a predetermined time period (ignition-required time period) is required. The example described below will be explained on the premise that a greater part of this ignition-required time period is occupied by a predetermined time period from a time point when fuel is subjected to an ignition to a time point when the fuel is actually ignited in the ignition start-up (ignition time period). Therefore, even if ignition to fuel is performed immediately at the time t3 when a re-start condition is satisfied, a time point when the fuel is actually ignited comes to the time t4. The crankshaft 24 continues rotating also in this time period from the time t3 to the time t4, and the position of a piston changes. As a result, the crank angle CA4 of the cylinder at the time t4 is larger than the crank angle CA3 at the time t3, and it is larger than the above-mentioned upper limit angle CAth2. In other words, the crank angle CA4 is too far from the top dead center. Therefore, even if fuel is actually ignited at this time, inertia sufficient to re-start the engine 10 cannot be obtained. Namely, the engine 10 cannot be re-started by the ignition start-up.

On the other hand, FIG. 2(*b*) shows an example in which a crank angle at a time point when fuel is actually ignited can attain inertia sufficient to re-start the engine 10, if the fuel is subjected to an ignition at a time point when the re-start demand occurs in a time period during which the automatic stop control is being performed similarly to FIG. 2(*a*).

Also in this example, the automatic stop control is initiated at the time t1, the inversion of the rotational direction of the crankshaft 24 takes place for the first time at the time t2 thereafter, and the re-start condition is satisfied at the time t3. Namely, the example shown in FIG. 2(*b*) is the same as the example shown in FIG. 2(*a*), so far. However, in this example, fuel is not subjected to an ignition immediately at the time t3 to initiate the ignition start-up when the re-start condition is satisfied, but fuel is subjected to an ignition at the time t5 which is later than the time t3.

The crank angle CA5 at the above-mentioned time t5 exceeds the upper limit of a crank angle which can attain inertia sufficient to re-start the engine 10 after ignition (upper limit angle CAth2). In other words, the crank angle CA5 is too far from the top dead center. Therefore, if fuel is actually ignited at this time point, inertia sufficient to re-start the engine 10 cannot be obtained. Namely, the engine 10 cannot be re-started by the ignition start-up.

However, as mentioned above, an ignition time period is required from a time point when fuel is subjected to an ignition to a time point when the fuel is actually ignited in the ignition start-up. Therefore, even though the ignition to fuel is performed at the time T5 when the crank angle CA5 is too far from the top dead center as mentioned above, a time point when the fuel is actually ignited comes to the time t6 which is later than the time t5. Also in this time period from the time t5 to the time t6, the crankshaft 24 continues rotating and the position of a piston changes. As a result, the crank angle CA6 of the cylinder concerned at the time t6 is smaller than the crank angle CA5 at the time t5, and it is smaller than the above-mentioned upper limit angle CAth2. In other words, the crank angle CA6 is sufficiently close to the top dead center. Therefore, when fuel is actually ignited at this time point, inertia sufficient to re-start the engine 10 can be obtained. Namely, the engine 10 can be re-started by the ignition start-up.

As mentioned above, the present device adjusts the initiation timing of the ignition start-up in consideration of the compression when fuel is actually ignited in an expansion stroke cylinder, in a case where the engine 10 is re-started by the ignition start-up. Specifically, the present device predicts an actual ignition time point and a crank angle at the ignition time point in a case where the injection start-up is initiated at the present time whenever a predetermined time period has passed. Then, it performs a re-start of the engine by the ignition start-up when the crank angle falls within a predetermined range in which a sufficient compression can be attained, and it does not perform the ignition start-up when it is not the case. Thereby, the present device can more certainly re-start the engine 10 by the ignition start-up. The above is an outline of the present device.

(Specific Operation)

Figure 3:
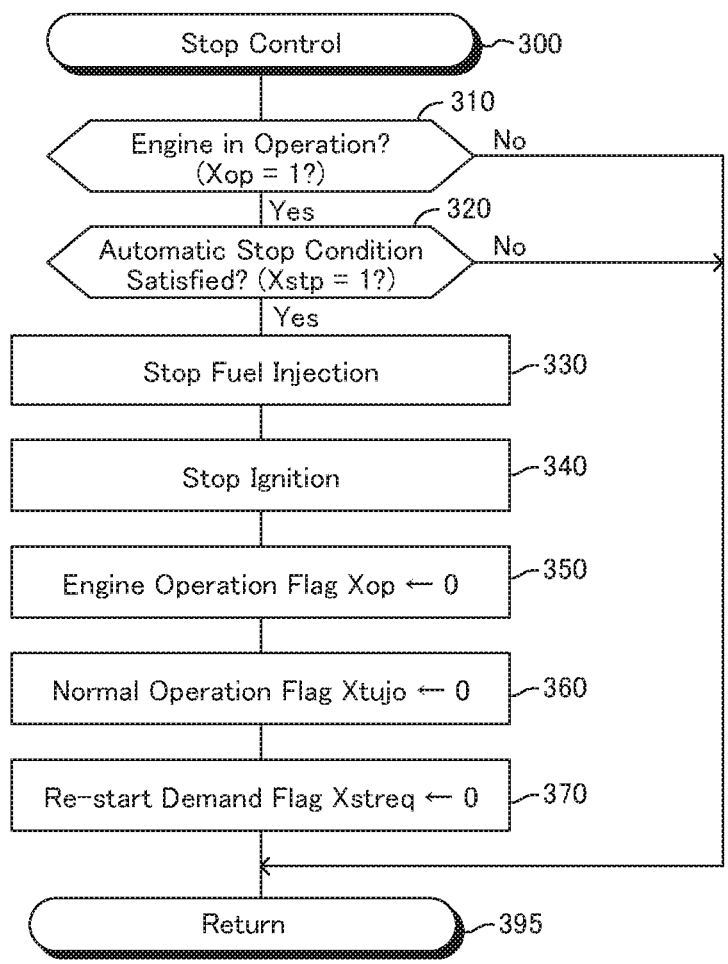
FIG. 3 is a flowchart for showing a routine in which the CPU shown in FIG. 1 performs.

Next, specific operation of the present device will be explained. The CPU of the ECU 80 of the present device (hereafter, simply referred to as the "CPU") is configured to perform a routine shown in FIG. 3 as a flowchart whenever a predetermined time has passed. The automatic stop control is initiated by this routine.

When it comes to a predetermined timing, the CPU will initiates processing from step 300, progresses to step 310, and judges whether the engine 10 is in operation at the present time. Namely, the CPU judges whether a value of an engine operation flag Xop is "1." The engine operation flag Xop shows that the engine 10 is in operation (after being started up and before the initiation of the automatic stop control), when its value is "1." The engine operation flag Xop shows that the engine 10 has been stopped automatically (after the initiation of the automatic stop control and before the completion of a re-start), when its value is "0." When the value of the engine operation flag Xop is "0", the CPU judges as "No" at step 310, progresses to step 395, and once ends this routine.

When the value of the engine operation flag Xop is "1", the CPU judges as "Yes" at step 310, progresses to step 320, and judges whether the above-mentioned automatic stop condition is satisfied. More specifically, the CPU judges whether a value of a stop condition satisfaction flag Xstp is "1." By the CPU performing a routine which is not shown, the value of the stop condition satisfaction flag Xstp is set to "1" when the above-mentioned automatic stop condition is satisfied, and it is set to "0" when the above-mentioned re-start demand occurs. When the value of the stop condition satisfaction flag Xstp is "0", the CPU judges as "No" at step 220, progresses to step 395, and once ends this routine. Therefore, in this case, the automatic stop control which will be mentioned later is not performed.

On the other hand, when the value of the stop condition satisfaction flag Xstp is "1", the CPU judges as "Yes" at step 320, performs in order processing of step 330 or step 370 described below, progresses to step 395, and once ends this routine. Thereby, the automatic stop control is performed.

Step 330: The CPU stops fuel injection by stopping sending out of an instruction signal to the fuel injection valve 39.

Step 340: The CPU maintains primary side coils 37*a* of the respective cylinders in a non-electrification state by stopping sending out of an instruction signal to the ignition apparatus 35 (igniter 38), and thereby stops an ignition.

Step 350: The CPU sets the value of the engine operation flag Xop to "0."

Step 360: The CPU sets a value of a normal operation flag Xtujo to "0."The value of the normal operation flag Xtujo is set to "1" when the normal operation control is being performed as will be mentioned later.

Step 370: The CPU sets a value of a re-start demand flag Xstreq to "0." By the CPU performing a routine which is not shown, the value of the re-start demand flag Xstreq is set to "1" when judged that the above-mentioned re-start demand has occurred.

As mentioned above, in this example, when a predetermined automatic stop condition is satisfied, the present device performs an automatic stop control in which an injection of fuel from the fuel injection valve 39 is stopped and an ignition by the ignition apparatus 35 is stopped to stop the rotation of the engine 10. However, the present device may perform the automatic stop control only by stopping an injection of fuel, without stopping an ignition. In this case, the above-mentioned step 340 is not performed.

Figure 4:
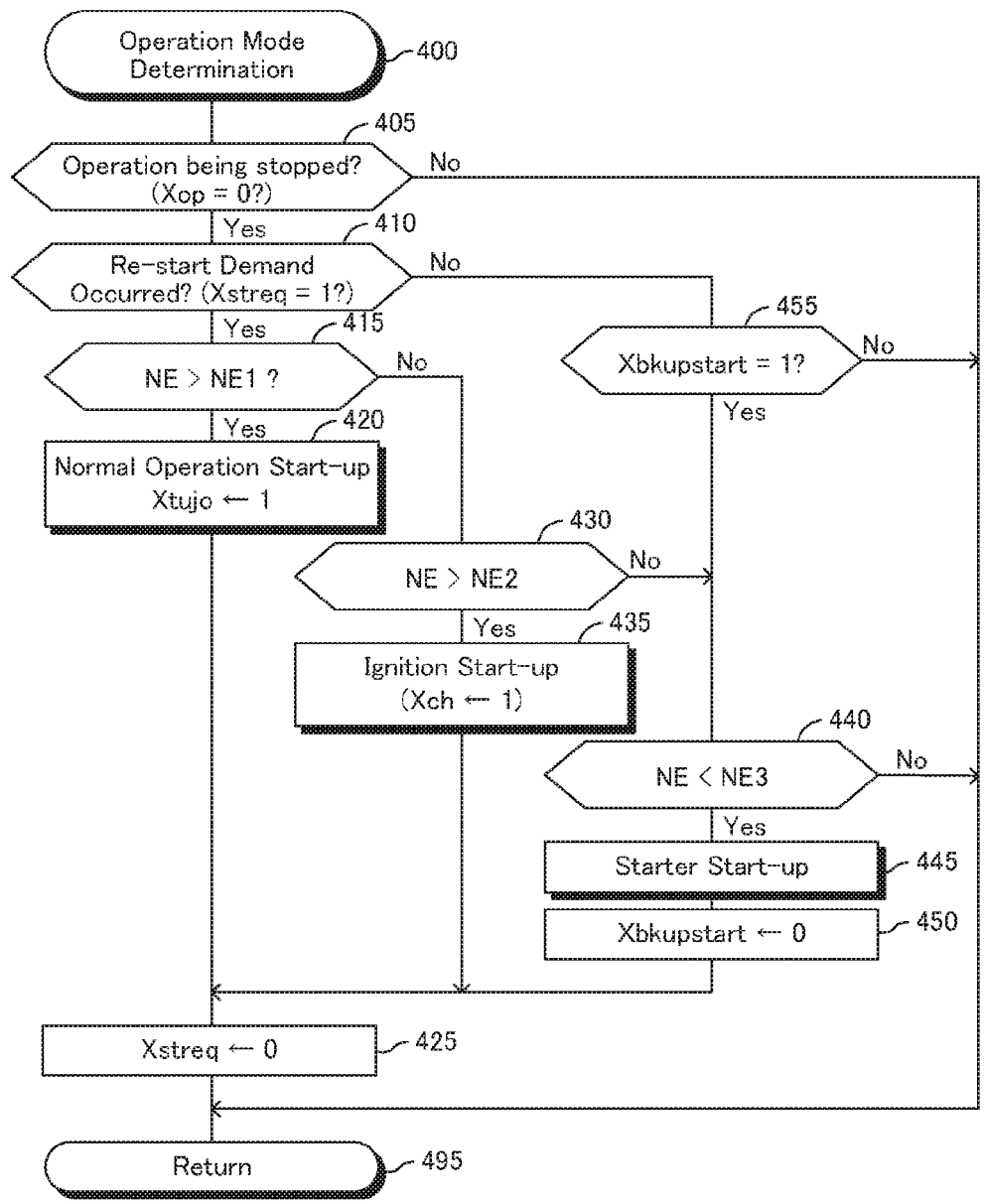
FIG. 4 is a flowchart for showing a routine in which the CPU shown in FIG. 1 performs.

Furthermore, the CPU is configured to perform a routine shown in FIG. 4 as a flowchart, whenever a predetermined time has passed. This routine determines which control is performed in order to re-start the engine 10.

When it comes to a predetermined timing, the CPU initiates processing from step 400, progresses to step 405, and judges whether operation of the engine 10 is being stopped (the automatic stop control is in execution) at the present time. Namely, the CPU judges whether the value of the engine operation flag Xop is "0." When the value of the engine operation flag Xop is "1", the CPU judges as "No" at step 405, progresses to step 495, and once ends this routine.

On the other hand, when the value of the engine operation flag Xop is "0" (when the automatic stop control is in execution), the CPU judges as "Yes" at step 405, progresses to step 410, and judges whether the re-start demand has occurred. More specifically, the CPU judges whether the value of the re-start demand flag Xstreq is "1."

Now, assume that the re-start demand has occurred and the value of the re-start demand flag Xstreq has been set to "1." In this case, the CPU judges as "Yes" at step 410, progresses to step 415, and judges whether the engine rotational speed NE is higher than the first threshold value speed NE1.

When the engine rotational speed NE is higher than the first threshold value speed NE1, the CPU judges as "Yes" at step 415, progresses to step 420, and sets the value of the normal operation flag Xtujo to "1" so that a start-up by the above-mentioned normal control (normal operation start-up) is performed. The normal control will be explained later in detail, referring to FIG. 13. Thereafter, the CPU progresses to step 425, sets the value of the re-start demand flag Xstreq to "0", progresses to step 495, and once ends this routine. As a result, when the engine rotational speed NE at the time point when the re-start demand occurs is higher than the first threshold value speed NE1, the engine 10 is re-started by the normal control.

On the other hand, when the engine rotational speed NE at the time point when the re-start demand occurs is not higher than the first threshold value speed NE1, the CPU judges as "No" at step 415, progresses to step 430, and judges whether the engine rotational speed NE is higher than the second threshold value speed NE2. The second threshold value speed NE2 is higher than 0 (zero), and is smaller (lower) than the first threshold value speed NE1.

Figure 5:
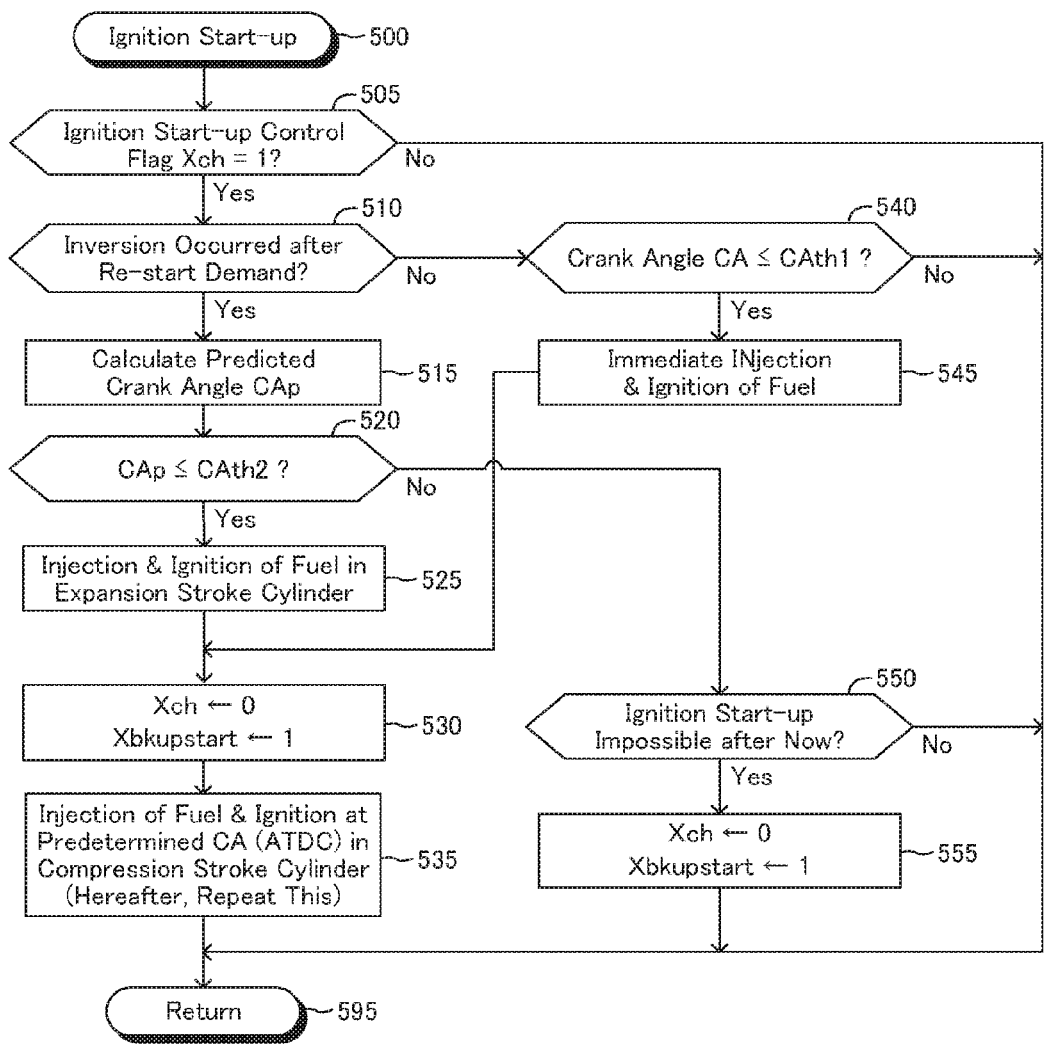
FIG. 5 is a flowchart for showing a routine in which the CPU shown in FIG. 1 performs.

When the engine rotational speed NE is higher than the second threshold value speed NE2, the CPU judges as "Yes" at step 430, progresses to step 435, sets a value of an ignition start-up control flag Xch to "1" so that the above-mentioned ignition start-up control is performed. The ignition start-up control will be explained later in detail, referring to FIG. 5. Thereafter, the CPU progresses through step 425, and once ends this routine. As a result, when the engine rotational speed NE at the time point when the re-start demand occurs is not higher than the first threshold value speed NE1 and is higher than the second threshold value speed NE2, the engine 10 is re-started by the ignition start-up control.

On the other hand, when the engine rotational speed NE at the time point when the re-start demand occurs is not higher than the second threshold value speed NE2, the CPU judges as "No" at step 430, progresses to step 440, and judges whether the engine rotational speed NE is smaller (lower) than the third threshold value speed NE3. The third threshold value speed NE3 is higher than 0 (zero) and is smaller (lower) than the second threshold value speed NE2.

When the engine rotational speed NE is not lower than the third threshold value speed NE3, the CPU is judged as "No" at step 440, progresses directly to step 495, and once ends this routine. As a result, when this routine is performed next time, the CPU progresses to step 405 to step 415, step 430 and step 440. As a result, the CPU stands by until the engine rotational speed NE becomes lower than the third threshold value speed NE3.

Then, when the engine rotational speed NE becomes lower than the third threshold value speed NE3, the CPU judges as "Yes" at step 440, progresses to step 445, and performs the above-mentioned starter start-up control. Thereafter, the CPU progresses to step 450, sets a value of a backup re-start flag Xbkupstart to "0", progresses though step 425, and once ends this routine. As a result, when the engine rotational speed NE becomes lower than the third threshold value speed NE3, the engine 10 is re-started by the starter start-up control.

By the way, in a case where the value of the re-start demand flag Xstreq has been set to "0" (the re-start demand has not occurred) at the time point when the CPU performs processing of step 410, the CPU judges as "No" at the step 410, progresses to step 455, and judges whether the value of the backup re-start flag Xbkupstart is "1." When the value of this flag Xbkupstart is "0", the CPU judges as "No" at step 455, and once ends this routine. On the other hand, when the value of the flag Xbkupstart is "1", the CPU judges as "Yes" at step 455, and progresses to step 440. As a result, when the engine rotational speed NE becomes lower than the third threshold value speed NE3, the engine 10 is re-started by the starter start-up control. This flow from step 455 to step 440 and step 445 will be mentioned later.

<Details of Ignition Start-Up Control>

Next, detail of the above-mentioned ignition start-up control will be explained. The CPU is configured to perform a routine shown in FIG. 5 as a flowchart, whenever a predetermined time has passed. Therefore, when it comes to a predetermined timing, the CPU starts processing from step 500 of FIG. 5, progresses to step 505, and judges whether the value of the ignition start-up control flag Xch is "1." When the value of the ignition start-up control flag Xch is not "1", the CPU judges as "No" at step 505, progresses to step 595, and once ends this routine.

On the other hand, when the value of the ignition start-up control flag Xch is "1", the CPU judges as "Yes" at step 505, progresses to step 510, and judges whether the present time is after the re-start condition is satisfied and there is any history that the inversion of the rotational direction of the crankshaft 24 has taken place.

When the condition that "the present time is after the re-start condition is satisfied and there is any history that the inversion of the rotational direction of the crankshaft 24 has taken place" is not satisfied, the CPU judges as "No" at step 510, progresses to step 540, and judges whether the crank angle CA of the expansion stroke cylinder at that time point is not larger than a predetermined upper limit angle (namely, the first upper limit angle CAth1).

Figure 6:
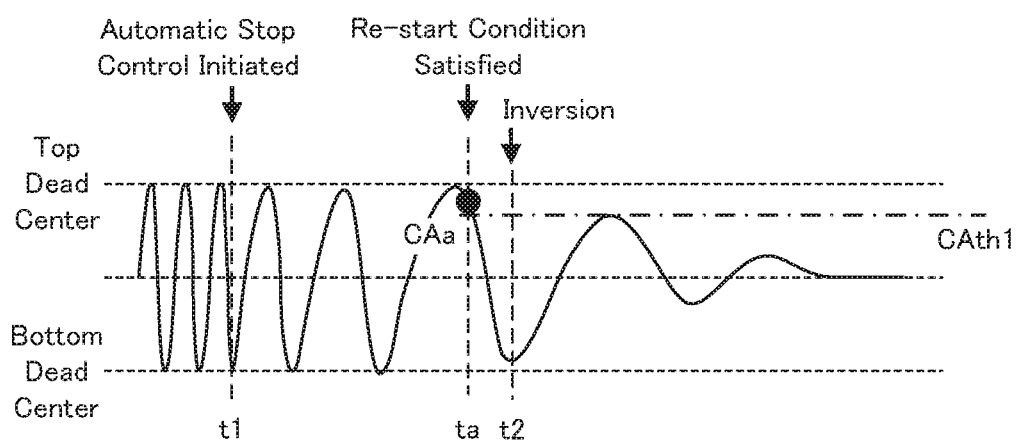
FIG. 6 is a schematic time chart for showing an example of a situation where a re-start condition is satisfied when a crank angle CA is not larger than a first upper limit angle CAth1 in a case where there is no history that an inversion of a rotational direction of a crankshaft has taken place.

For instance, as shown by a black dot in FIG. 6, when the above-mentioned crank angle CA (=CAa) at the present time (time ta) when the re-start condition is satisfied is not larger than the first upper limit angle CAth1, the CPU judges as "Yes" at step 540, and immediately performs an injection and an ignition of fuel in the expansion stroke cylinder at step 545. The crank angle CA (=CAa) at this time is not larger than the first upper limit angle CAth1 (that is, sufficiently close to the top dead center). Therefore, when an injection and an ignition of fuel in the expansion stroke cylinder is immediately performed, inertia sufficient to re-start the engine 10 is obtained after ignition. As a result, the fuel-air mixture formed with the fuel injected in the combustion chamber of the expansion stroke cylinder is ignited and burned.

Thereafter, the CPU progresses to step 530, sets the value of the ignition start-up control flag Xch to "0", and sets the value of the backup re-start flag Xbkupstart as "1." Thereafter, as shown in step 535, the CPU performs a normal operation of the engine 10 by injecting fuel into the compression stroke cylinder and igniting the fuel-air mixture formed with the above-mentioned fuel when the crank angle of the cylinder is a predetermined angle after the compression top dead center. Thereafter, the CPU progresses to step 595 and once ends this routine. Thereby, a re-start of the engine 10 by the ignition start-up control is performed.

On the other hand, when the above-mentioned crank angle CA (=CAa) at the present time (time ta) is larger than the first upper limit angle CAth1 (CA>CAth1), the CPU judges as "No" at step 540, progresses to step 595, and once ends this routine. Namely, in this case, it is predicted that inertia sufficient to re-start the engine 10 is not obtained after ignition even when an injection and an ignition of fuel in the expansion stroke cylinder similarly to the above-mentioned step 545. Therefore, the CPU stands by an opportunity that the compression increases (rises) in association with a repetition of the inversion between normal rotation and reversed rotation of the crankshaft (swinging) thereafter.

When the present time is after the re-start condition is satisfied and there is any history that the inversion of the rotational direction of the crankshaft 24 has taken place, the CPU judges as "Yes" at step 510, and calculates the predicted crank angle CAp which is the crank angle CA of the expansion stroke cylinder at the predicted ignition time in a case where the ignition start-up is initiated at the present time at step 515.

In this example, the ECU 80 has previously memorized as a map in the ROM, a correspondence relation between the ignition-required time period ΔT which is a time period required from when initiating processing for performing the ignition start-up (an injection and an ignition of fuel) till when the fuel is actually ignited and the crank angle CA at the present time. Then, the CPU identifies the ignition-required time period ΔT by applying the crank angle CA of the expansion stroke cylinder at the present time to the map. Furthermore, the CPU calculates the predicted crank angle CAp, based on the above-mentioned crank angle CA, the above-mentioned ignition-required time period ΔT and the engine rotational speed NE at the present time.

Thereafter, the CPU progresses to step 520. The CPU judges whether the predicted crank angle CAp is not larger than a predetermined upper limit angle (namely, the second upper limit angle CAth2) at step 520.

Figure 7A:
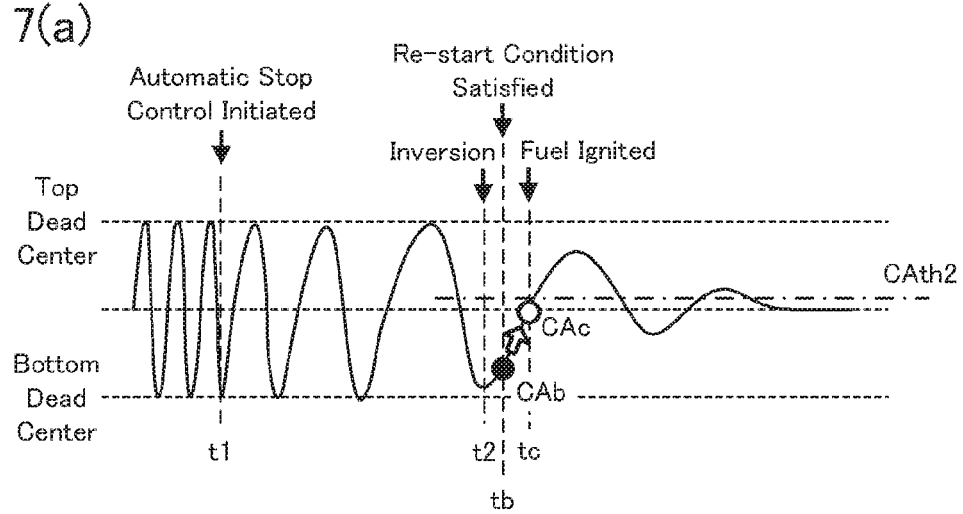
FIG. 7(a) and FIG. 7(b) are schematic time charts for showing a shift from a state where a predicted crank angle CAp is larger than a second upper limit angle CAth2, as shown in FIG. 7(a), to a state where the predicted crank angle CAp is not larger than the second upper limit angle CAth2, as shown in FIG. 7(b), as time proceeds, during a reversed rotation of a crankshaft immediately after a first time inversion time point.

For instance, as represented by a black dot shown in FIG. 7(a), at the present time (time tb) when the re-start conditions is satisfied, the crank angle CA of the expansion stroke cylinder is CAb (CA=CAb). As mentioned above, the CPU calculates the predicted crank angle CAp, based on the crank angle CA (=CAb) at this time point, the ignition-required time period ΔT (=tc−tb) which is a time length of a time period from the present time (time tb) till the predicted ignition time (time tc), and the engine rotational speed NE at the present time. As represented by an outlined white dot shown in FIG. 7(a), the predicted crank angle CAp at the predicted ignition time (time tc) is CAc, and is larger than the second upper limit angle CAth2 (CAp>CAth2).

In the above-mentioned case, the CPU judges as "No" at step 520, and progresses to step 550. In step 550, the CPU judges whether an opportunity that the engine 10 can be re-started by the ignition start-up will occur after the present time. Specifically, the CPU can judge that no opportunity that the engine 10 can be re-started by the ignition start-up will occur after the present time, when a situation where it is judged as "No" at step 520 (namely, a situation where CAp>CAth2 is true) is continuing for a predetermined time period.

Alternatively, the CPU can judge that no opportunity that the engine 10 can be re-started by the ignition start-up will occur after the present time, when the extremum of the crank angle CA which will appear in the future does not become the second upper limit angle CAth2 or less. This "extremum of the crank angle CA which will appear in the future" may be calculated, for instance, based on a map (data table) which represents a correspondence relation between the engine rotational speed NE and the extremum of the crank angle CA in the above-mentioned "swinging", a crank physics model, and an approximate expression which represents damping property of extremum of the rotational speed of the crankshaft 24, etc.

When it is predicted that no opportunity that the engine 10 can be re-started by the ignition start-up will occur after the present time, the CPU judges as "Yes" at step 550, progresses to step 555, and sets the value of the ignition start-up control flag Xch to "0" and sets the value of the backup re-start flag Xbkupstart to "1." Thereafter, the CPU progresses to step 595 and once ends this routine. Thereby, the CPU gives up re-start of the engine 10 by the ignition start-up control.

On the other hand, when it is predicted that an opportunity that the engine 10 can be re-started by the ignition start-up will occur after the present time, the CPU judges as "No" at step 550, progresses to step 595, and once ends this routine. Thereby, the CPU waits for the next opportunity to re-start the engine 10 by the ignition start-up control.

Figure 7B:
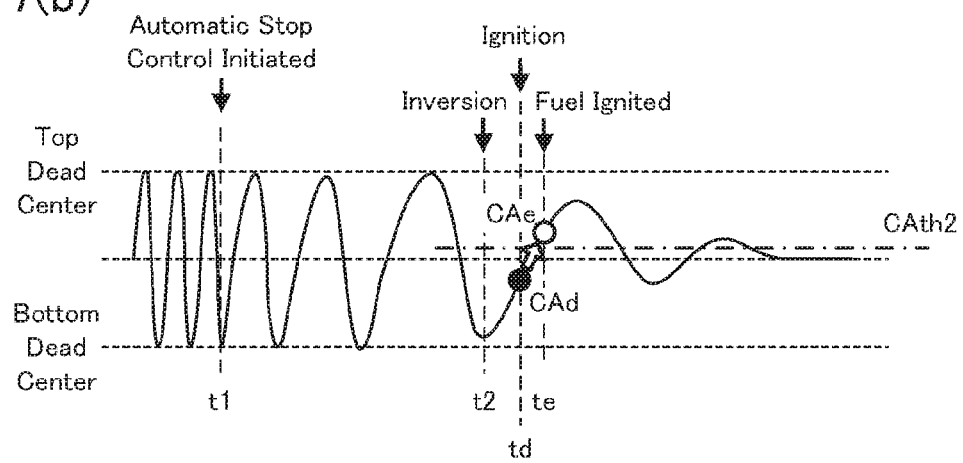

Thereafter, when time passes to the time td, the crank angle CA of the expansion stroke cylinder comes to CAd (CA=CAd), as represented by a black dot shown in FIG. 7(b). In the above-mentioned time period from the time tb till the time td which is the present time, the crankshaft 24 is reversely rotating, and the crank angle CA of the expansion stroke cylinder is further approaching the top dead center. As mentioned above, the CPU calculates the predicted crank angle CAp from the crank angle CA (=CAd) at this time point, etc. As represented by an outlined white dot shown in FIG. 7(b), the predicted crank angle CAp at the predicted ignition time (time te) is CAe, and it is not larger than the second upper limit angle CAth2 (CAp≤CAth2).

In the above-mentioned case, the CPU judges as "Yes" at step 520, progresses to step 525, and performs an injection and an ignition of the fuel in the expansion stroke cylinder. As a result, the fuel-air mixture formed with the fuel injected into the combustion chamber of the expansion stroke cylinder is ignited and burned. Thereafter, the CPU progresses to step 595 through the above-mentioned steps 530 to 535, and once ends this routine. Thereby, a re-start of the engine 10 by the ignition start-up control is performed.

Figure 8:
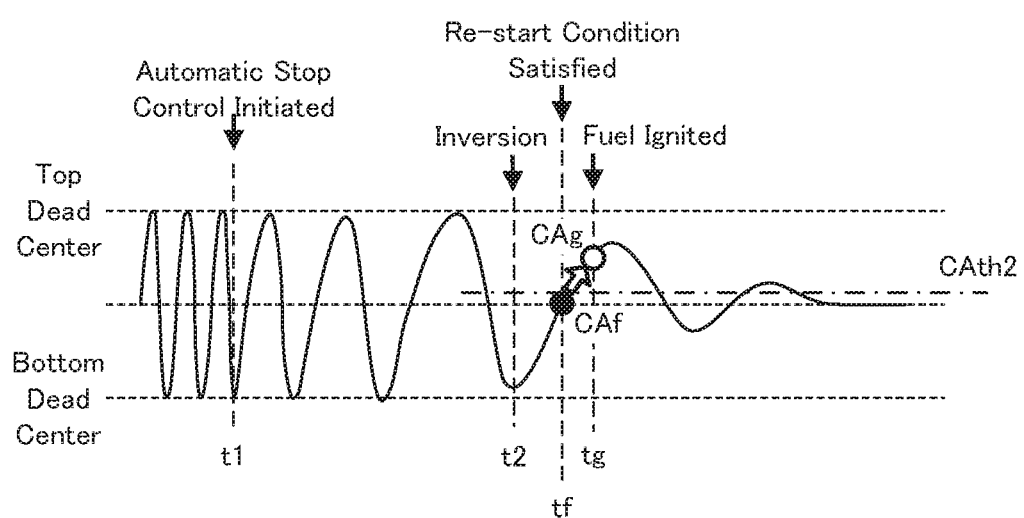
FIG. 8 is a schematic time chart for showing an example of situations where the predicted crank angle CAp becomes not larger than the second upper limit angle CAth2 in a time period during which swinging of a crankshaft is occurring.
Figure 9:
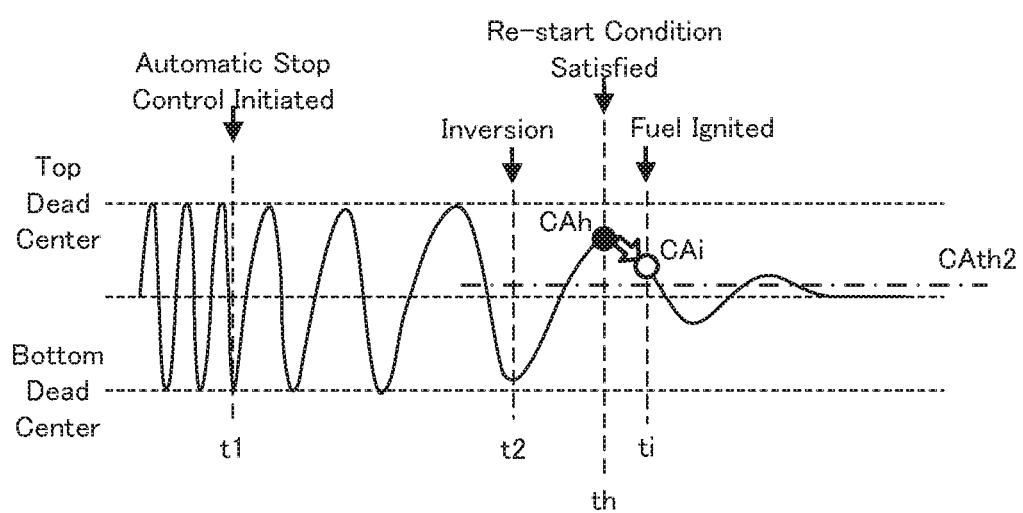
FIG. 9 is a schematic time chart for showing another example of situations where the predicted crank angle CAp becomes not larger than the second upper limit angle CAth2 in a time period during which swinging of a crankshaft is occurring.

As shown in FIG. 8 and FIG. 9, for a while after the time td, the predicted crank angle CAp which is calculated as mentioned above is not larger than the second upper limit angle CAth2 (in FIG. 8 and FIG. 9, CAg≤CAth2 and CAi≤CAth2, respectively). When the re-start demand has occurred under such a situation (the re-start condition is satisfied), the CPU judges as "Yes" at step 520, and performs a series of the above-mentioned processing of step 525 and the subsequent steps.

By the way, in the example shown in FIG. 7(b) and FIG. 8, fuel is ignited while the crank angle CA of the expansion stroke cylinder is decreasing in association with the reversed rotation of the crankshaft 24 (that is, the piston is approaching the top dead center). On the other hand, in the example shown in FIG. 9, fuel is ignited while the crank angle CA of the expansion stroke cylinder is increasing in association with the normal rotation of the crankshaft 24 (that is, the piston is getting away from the top dead center). Thus, the ignition start-up control may be performed when the crank angle of the expansion stroke cylinder is getting away from the top dead center while the engine 10 is normally rotating, or it may be performed when the crank angle of the expansion stroke cylinder is approaching the top dead center while the engine 10 is reversely rotating.

Figure 10A:
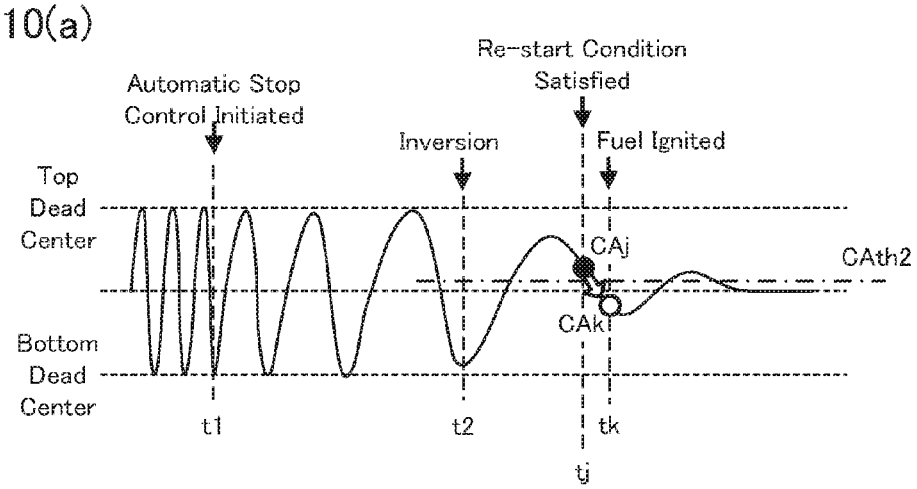
FIG. 10(a) and FIG. 10(b) are schematic time charts for showing a shift from a state where the predicted crank angle CAp is larger than the second upper limit angle CAth2, as shown in FIG. 10(a), to a state where the predicted crank angle CAp is not larger than the second upper limit angle CAth2, as shown in FIG. 10(b), as time proceeds, after a certain length of time has passed since the first time inversion time point.

By the way, in a situation shown in FIG. 10(a), after the situation shown in FIG. 9, as represented by a black dot, the predicted crank angle CAp calculated at the time tj is CAk (that is, the piston is getting away from the top dead center), and it is larger than the second upper limit angle CAth2 (CAp>CAth2). Under such a situation, even in a case where the re-start demand has occurred, the CPU judges as "No" at step 520, and performs a series of the above-mentioned processing of step 550 and the subsequent steps.

Figure 10B:
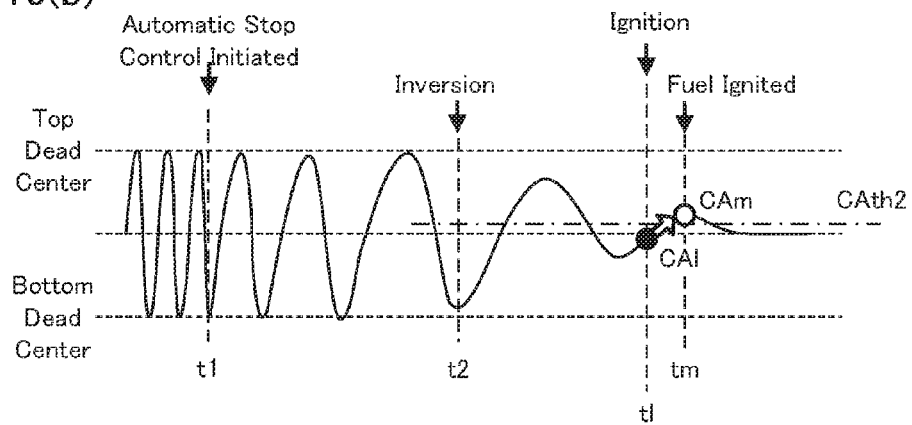

Thereafter, when time further passes, as represented by a black dot shown in FIG. 10(b), the predicted crank angle CAp calculated at the time tl is CAm, and it is not larger than the second upper limit angle CAth2 (CAp≤CAth2). When the re-start demand has occurred under such a situation (the re-start condition is satisfied), the CPU judges as "Yes" at step 520, and performs a series of the above-mentioned processing of step 525 and the subsequent steps.

Figure 11:
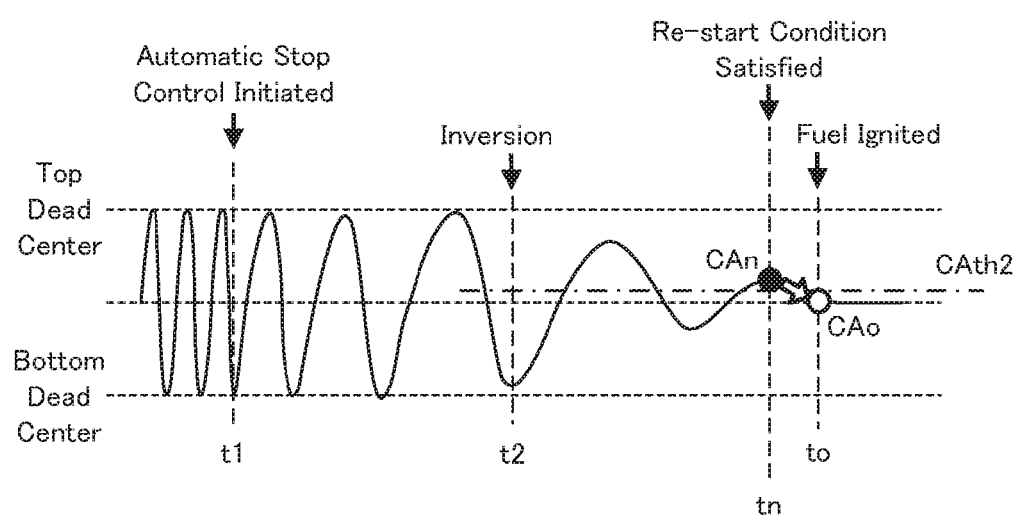
FIG. 11 is a schematic time chart for showing an example of situations where the CPU judges that no opportunity to re-start the engine 10 by an ignition start-up will occur after the present time.

By the way, as apparent from FIG. 6 to FIG. 10(a) and FIG. 10(b) which have been explained so far, the amplitude in the swinging of the crank angle CA of the expansion stroke cylinder becomes gradually smaller (damps), at or after the first time inversion time point which is a time point when the rotational direction of the crankshaft 24 is inverted for the first time during execution of the automatic stop control. Therefore, for example, as shown in FIG. 11, the predicted crank angle CAp (for instance, CAo) which is calculated at the present time (the time to in FIG. 11) when the re-start condition is satisfied becomes larger than the second upper limit angle CAth2 in due course.

In the above-mentioned case, a situation where it is judged as "No" at step 520 (namely, a situation where CAp>CAth2 is true) continues for a predetermined time period. Therefore, the CPU judges as "Yes" at step 550, as mentioned above.

In the above-mentioned case, the CPU waits for an opportunity to perform the ignition start-up until it detects that a situation where CAp>CAth2 is true continues for a predetermined time period. However, as mentioned above, the CPU can judge whether an opportunity that the engine 10 can be re-started by the ignition start-up will occur after the present time by judging whether the extremum of the crank angle CA which will appear in the future becomes the second upper limit angle CAth2 or less. In this case, since it is not necessary to wait for a situation where CAp>CAth2 is true to continue for a predetermined time period, it can be quickly judged whether the engine 10 can be re-started by the ignition start-up, and the engine 10 can be re-started more quickly.

As mentioned above, the present device performs a re-start of the engine 10 by the ignition start-up when the crank angle of the expansion stroke cylinder at the predicted ignition time falls within a predetermined range in which a sufficient compression can be attained (namely, CAp≤CAth2 is true), and it does not perform the ignition start-up when it is not the case. Thereby, the present device can more certainly re-start the engine 10 by the ignition start-up. The above is the detail of the ignition start-up control.

By the way, in step 530 or step 555, when the CPU progresses to step 455 in FIG. 4 after the value of the backup re-start flag Xbkupstart is set to "1", the CPU judges as "Yes" at the step 455, and progresses to step 440. Therefore, even in a case where the engine 10 is not successfully re-started by the ignition start-up control, when the engine rotational speed NE becomes lower than the third threshold value speed NE3, the starter start-up control is performed and, as a result, the engine 10 is re-started.

Figure 12:
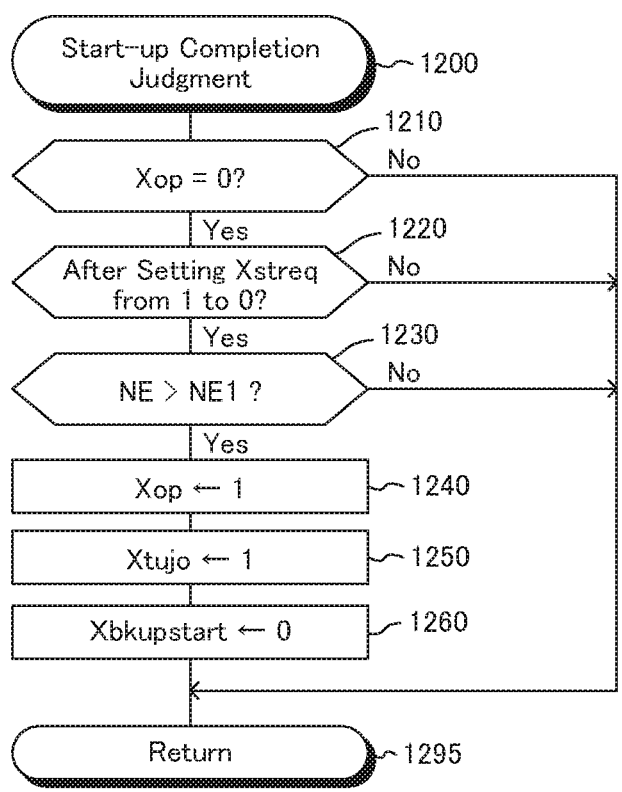
FIG. 12 is a flowchart for showing a routine in which the CPU shown in FIG. 1 performs.

Furthermore, the CPU performs a "start-up completion judging routine" shown in FIG. 12 as a flowchart, whenever a predetermined time has passed. Therefore, when it comes to a predetermined timing, the CPU initiates processing from step 1200 in FIG. 12, progress to step 1210, and judges whether the value of the engine operation flag Xop is "0." When the value of the engine operation flag Xop is not "0" (namely, the engine 10 is in operation), the CPU judges as "No" at step 1210, and once ends this routine.

On the other hand, when the value of the engine operation flag Xop is "0" (namely, the engine 10 is in a situation after the initiation of the automatic stop control and before the completion of a re-start), the CPU judges as "Yes" at step 1210, progresses to step 1220, and judges whether it is after the value of the re-start demand flag Xstreq is set to "0" from "1." As will be understood from step 410 and step 425 in FIG. 4, when some kind of start-up control is performed after a re-start demand occurs and the value of the re-start demand flag Xstreq is set to "1" (refer to step 420, step 435 and step 445.), the value of the re-start demand flag Xstreq is returned to "0." Therefore, step 1220 is a step in which it is judged whether some kind of start-up control has been performed.

When any kind of start-up control is not performed after the re-start demand occurs, the CPU judges as "No" at step 1220, and once ends this routine. On the other hand, when some kind of start-up control is performed after the re-start demand occurs, the CPU judges as "Yes" at step 1220, progressed to step 1230, and judges whether the engine rotational speed NE is higher than a start-up judging rotational speed (in this example, the first threshold value speed NE1). When the engine rotational speed NE is not higher than the start-up judging rotational speed NE1, the CPU judges as "No" at step 1230, and once ends this routine.

On the other hand, when the engine rotational speed NE is higher than the start-up judging rotational speed NE1, the CPU judges as "Yes" at step 1230, performs processing of step 1240 to step 1260 described below in order, and once ends this routine.

Step 1240: The CPU sets the value of the engine operation flag Xop to "1." Namely, the CPU judges that it has been shifted to a state where a re-start of the engine 10 has been completed and the engine 10 is being normally operated.

Step 1250: The CPU sets the value of the normal operation flag Xtujo to "1." As a result, a normal control by a routine shown in FIG. 13, which will be mentioned later, is performed (refer to a judgment as "Yes" in step 1305 of FIG. 13).

Step 1260: The CPU sets the value of the backup re-start flag Xbkupstart to "0."

Figure 13:
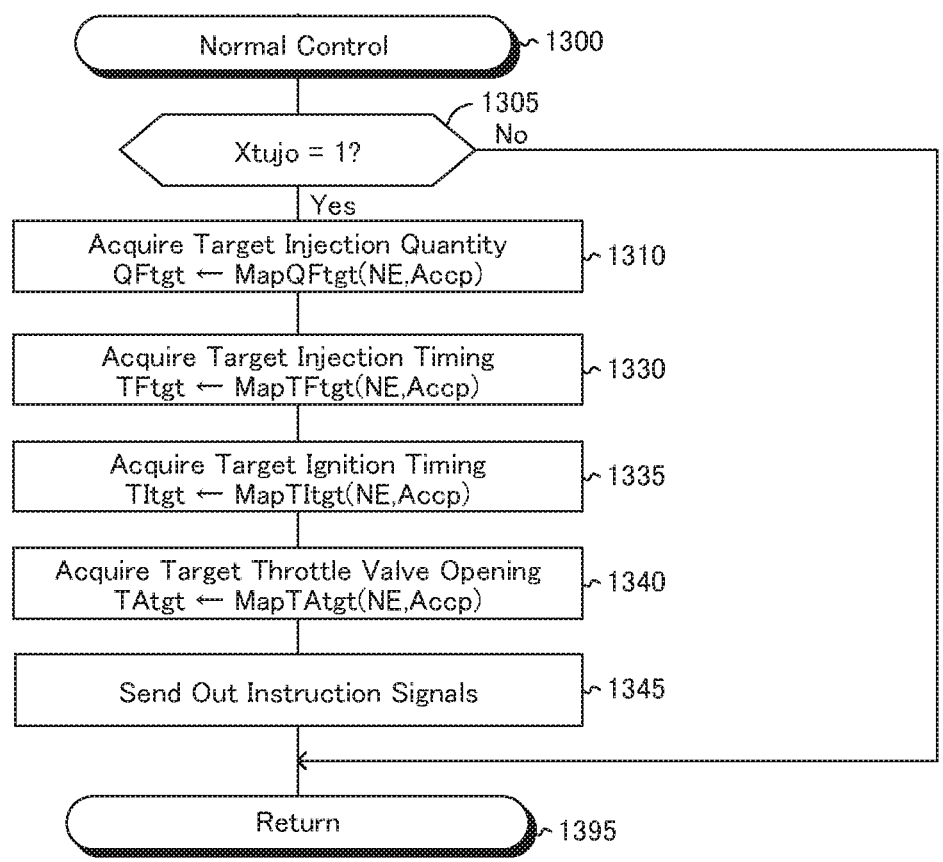
FIG. 13 is a flowchart for showing a routine in which the CPU shown in FIG. 1 performs.

Furthermore, the CPU performs a "normal control routine" shown in FIG. 13 as a flowchart, whenever a predetermined time has passed. Therefore, when it comes to a predetermined timing, the CPU initiates processing from step 1300 of FIG. 13, progress to step 1305, and judges whether the value of the normal operation flag Xtujo is "1." When the value of the normal operation flag Xtujo is not "1", the CPU judges as "No" at step 1305, and once ends this routine.

On the other hand, when the value of the normal operation flag Xtujo is "1", the CPU judges as "Yes" at step 1305, progresses to step 1310, acquires a target injection quantity QFtgt by applying "the engine rotational speed NE and the accelerator operation amount Accp as an alternative value of an engine load" to a look-up table MapQFtgt(NE, Accp).

Next, the CPU progresses to step 1330, and then acquires a target injection timing TFtgt by applying the engine rotational speed NE and the accelerator operation amount Accp to a look-up table MapTFtgt(NE, Accp). Furthermore, the CPU performs processing of step 1335 to step 1345 described below in order, progresses to step 1395, and once ends this routine.

Step 1335: The CPU acquires a target ignition timing TItgt by applying the engine rotational speed NE and the accelerator operation amount Accp to a look-up table MapTItgt(NE, Accp).

Step 1340: The CPU acquires a target throttle valve opening TAtgt by applying the engine rotational speed NE and the accelerator operation amount Accp to a look-up table MapTAtgt(NE, Accp).

Step 1345: The CPU sends out instruction signals the fuel injection valve 39, the ignition apparatus 35 and the throttle valve actuator 45a, respectively in accordance with the target injection quantity QFtgt, the target injection timing TFtgt, the target ignition timing TItgt and the target throttle valve opening TAtgt. By the above, the normal control is performed.

As mentioned above, the present device can choose an appropriate control among the normal operation control, the ignition start-up control and the starter start-up control depending on the engine rotational speed NE in a case where a re-start demand occurs during an execution of the automatic stop control, and even in a case where the ignition start-up is failed (not performed successfully), the present device can switch it to the starter start-up control and re-start an engine certainly and quickly. In addition, the present device controls an injection operation of fuel and an ignition operation to the fuel in consideration of the compression when the fuel is actually ignited in an expansion stroke cylinder, in the ignition start-up control. Thereby, an engine can be more certainly re-started by the ignition start-up.

The present invention is not limited to the above-mentioned embodiments, and can adopt various modifications within the scope of the present invention. For instance, in the above-mentioned embodiments, when the crank angle CA is not larger than the first upper limit angle CAth1 in a situation where there is no history that an inversion of a rotational direction of a crankshaft has taken place during an execution of a re-start control, an injection and an ignition of fuel in the expansion stroke cylinder is immediately performed (refer to step 545). However, it is not necessary to perform a re-start by such a method.

REFERENCE SIGNS LIST

10: Internal Combustion Engine, 32: Intake Valve, 34: Exhaust Valve, 35: Ignition Apparatus, 36: Spark Plug, 37: Ignition Coil, 38: Igniter, 39: Fuel Injection Valve, 53: Ternary Catalyst, 80: Electronic Control Unit (ECU).

What is claimed is:

1. A control device for an internal combustion engine applied to an internal combustion engine and comprising a control part, said internal combustion engine comprises a fuel injection part which supplies fuel to an combustion chamber, an ignition part which ignites the fuel supplied to said combustion chamber, a crankshaft, and a rotational speed detector which detects a crank angle that is a rotational position of said crankshaft and detects an engine rotational speed that is a rotational speed of said crankshaft, and said control part can perform an automatic stop control in which a fuel supply by said fuel injection part is stopped and a rotation of said crankshaft is stopped when a predetermined automatic stop condition is satisfied, and can re-start said internal combustion engine when a predetermined re-start condition is satisfied, wherein:

said control part comprises, a predicted crank angle calculation part which calculates a predicted crank angle that is a crank angle on the basis of an top dead center of a cylinder in an expansion stroke at a predicted ignition time that is a time point at which an ignition of fuel is predicted to take place if processing for performing an ignition start-up, in which fuel is supplied to a combustion chamber of said cylinder in an expansion stroke by said fuel injection part and said fuel supplied to said combustion chamber of said cylinder is ignited by said ignition part, was initiated at the present time, whenever a predetermined time period has passed, when said predetermined re-start condition is satisfied at or after a first time inversion time point that is a time point when a rotational direction of said crankshaft is inverted for the first time during execution of said automatic stop control, and an ignition start-up part which re-starts said internal combustion engine by said ignition start-up when said predicted crank angle is not larger than a predetermined upper limit angle, and does not initiate said ignition start-up when said predicted crank angle is larger than said upper limit angle.

2. The control device for an internal combustion engine, according to claim 1, wherein:

said predicted crank angle calculation part is configured to calculate said predicted crank angle by using, as said predicted ignition time, a time point when a predetermined ignition-required time period has passed since the present time.

3. The control device for an internal combustion engine, according to claim 2, wherein:

said predicted crank angle calculation part is configured to calculate said predicted crank angle by using, as said predicted ignition time, a time point when said predetermined ignition-required time period containing an ignition time period, which is a time period required from a time point when fuel was subjected to an ignition to a time point when the fuel was actually ignited if said processing for performing said ignition start-up was initiated at the present time.

4. The control device for an internal combustion engine, according to claim 2, wherein:

said predicted crank angle calculation part is configured to calculate said predicted crank angle by using, as said predicted ignition time, a time point when said predetermined ignition-required time period containing not only said ignition time period, but also a fuel-air mixture formation time period which is a time period required from a time point when fuel was supplied by said fuel injection part to a time point when a fuel-air mixture was formed if said processing for performing said ignition start-up was initiated at the present time.

5. The control device for an internal combustion engine, according to claim 2, wherein:

said predicted crank angle calculation part is configured to memorize a correspondence relation between a crank angle on the basis of an top dead center of a cylinder in an expansion stroke and said ignition-required time period in a case where said processing for performing said ignition start-up was initiated at said crank angle in said cylinder, and is configured to identify said ignition-required time period by applying, to said correspondence relation, a crank angle on the basis of the top dead center of said cylinder in an expansion stroke at the present time.

6. The control device for an internal combustion engine, according to claim 2, wherein:

said predicted crank angle calculation part is configured to calculate said predicted crank angle based on a crank angle on the basis of the top dead center of said cylinder in an expansion stroke at the present time, said ignition-required time period as a time length, and a predetermined angular velocity.

7. The control device for an internal combustion engine, according to claim 6, wherein:

said predicted crank angle calculation part is configured to calculate said predicted crank angle using said angular velocity which is determined based on an engine rotational speed at the present time.

* * * * *